(12) United States Patent
Kalker et al.

(10) Patent No.: US 8,060,444 B2
(45) Date of Patent: Nov. 15, 2011

(54) DETERMINING WHETHER A DIGITAL RIGHTS MANAGEMENT SYSTEM'S NATIVE LICENSE IS VALID

(75) Inventors: Antonius Kalker, Palo Alto, CA (US); William Knox Carey, Mountain View, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 1507 days.

(21) Appl. No.: 11/496,809

(22) Filed: Jul. 31, 2006

(65) Prior Publication Data
US 2008/0027869 A1    Jan. 31, 2008

(51) Int. Cl.
*G06F 21/00* (2006.01)
(52) U.S. Cl. ............... 705/51; 705/52; 705/57
(58) Field of Classification Search .............. 705/51, 705/52, 57
See application file for complete search history.

(56) References Cited

U.S. PATENT DOCUMENTS

| | | | |
|---|---|---|---|
| 2003/0149578 A1* | 8/2003 | Wong | 705/1 |
| 2004/0117628 A1* | 6/2004 | Colvin | 713/176 |
| 2004/0117663 A1* | 6/2004 | Colvin | 713/202 |
| 2004/0117664 A1* | 6/2004 | Colvin | 713/202 |
| 2009/0235361 A1* | 9/2009 | Sloo et al. | 726/26 |
| 2010/0211666 A1* | 8/2010 | Kvernvik et al. | 709/223 |
| 2010/0257356 A1* | 10/2010 | Greevenbosch et al. | 713/155 |

* cited by examiner

*Primary Examiner* — Pierre E Elisca (57) ABSTRACT

Embodiments of the present invention pertain to determining whether a digital rights management system's native license is valid. According to one embodiment, a value of a decision indicator is accessed at a digital rights management system. The decision indicator is set by a trusted entity other than the digital rights management system because the digital rights management system does not have sufficient information to determine how to set the decision indicator. The value of the decision indicator is used at the decision rights management system to determine whether the native license associated with the digital rights management system is valid.

20 Claims, 6 Drawing Sheets

DETERMINING WHETHER A DIGITAL RIGHTS MANAGEMENT SYSTEM'S NATIVE LICENSE IS VALID

TECHNICAL FIELD

Embodiments of the present invention relate to rendering digital content. More specifically, embodiments of the present invention relate to determining whether a digital rights management systems native license is valid.

BACKGROUND

In the past, people typically listened to or watched content on a stand alone electronic device. For example, a person would play a compact disc (CD) on a stereo system. Similarly, a person would watch a digital versatile disc (DVD) or a broadcast television show on their television. Music and movies are examples of "digital content." The digital content can be multimedia. Apple™ and "Yahoo! Music Engine™ (YME)" are examples of service providers. As electronic devices and the Internet have developed, service providers are making digital content available to users over the Internet. For example, Apple™ has made a lot of music available to users over the Internet. A person can download music that Apple™ has made available to their iPOD™. Further, YME™ has also made music available to users over the Internet. A person could download the music that YME™ has made available to a personal computer or a lap top.

In order to make profits, service providers charge people for the content they provide. Service providers cannot afford to provide digital content for free therefore digital rights management systems have been developed to control and enforce the way that digital content is distributed and used by people in order to protect the financial interests of service providers.

Figure 1:
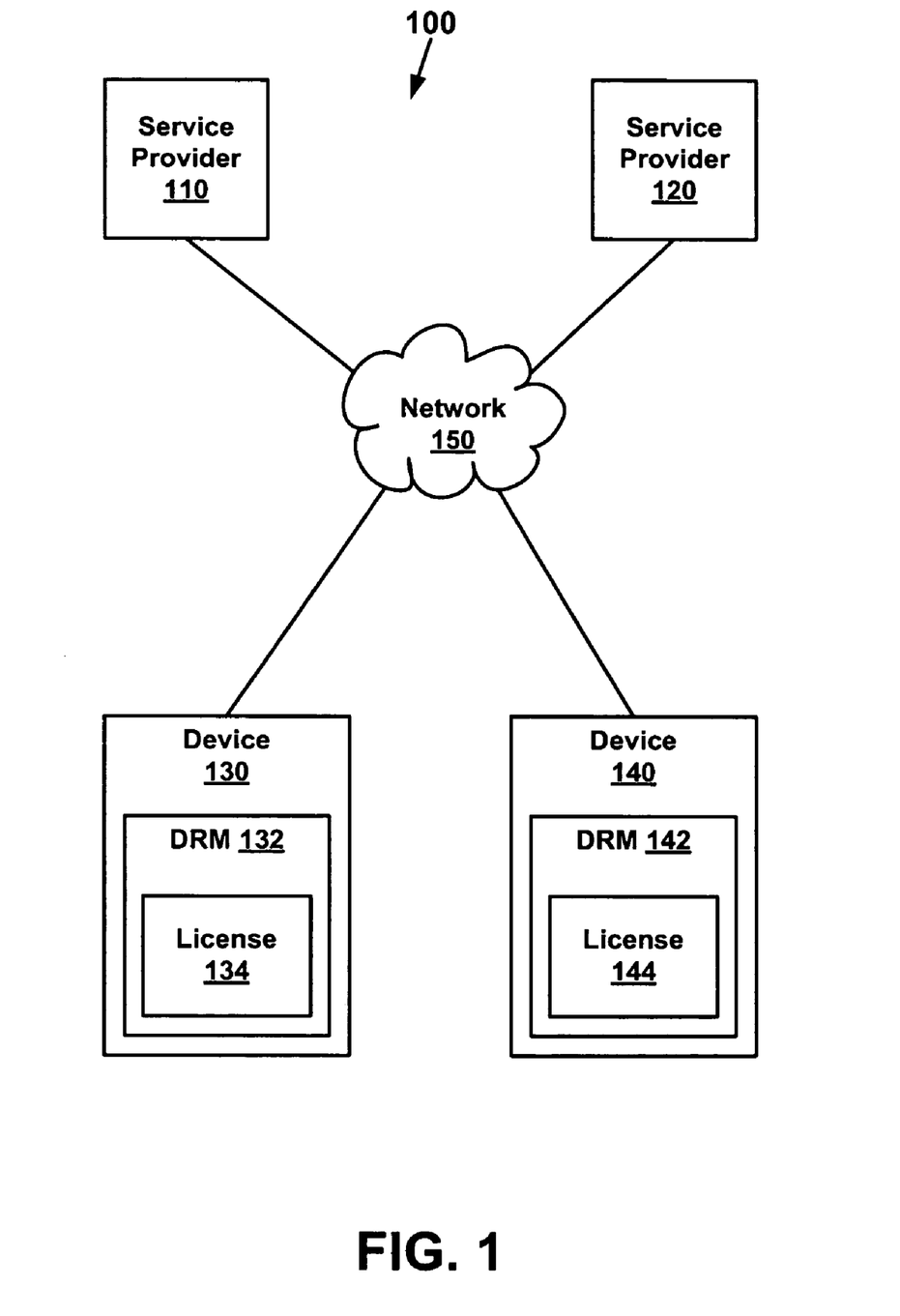
FIG. 1 depicts a block diagram of a conventional system for service providers to provide digital content to users.

FIG. 1 depicts a block diagram of a conventional system for service providers to provide digital content to users. The system 100 includes two service providers 110 and 120, a network 150, and two devices 130, 140. Each of the devices 130, 140 include digital rights management (DRM) systems 132, 142 and licenses 134, 144 (also referred to herein as "native licenses" since they are native to the DRM systems) for controlling and enforcing the way content obtained from respective service providers 110, 120 may be used. Service provider 110 could be YME™ and service provider 120 could be Apple™. Device 130 could be a personal computer and device 140 could be an iPOD™ (Apple™'s portable music player). The digital rights management system 132 can be used for obtaining content from YME™ and digital rights management system 142 can be used for obtaining content from Apple™. Examples of digital rights management systems include, but are not limited to, Apple FairPlay™, Microsoft™ DRM, Open Mobile Alliance™ (OMA) DRM, and Real Helix DRM™.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Overview

Conventionally, people have only been allowed to play digital content from a particular service provider on a device that can communicate with that particular service provider. For example, only digital content from Apple™ can be downloaded to an iPOD™.

People are starting to want to have several devices that can access the same digital content. However, conventional implementations of licenses do not support downloading the same digital content to several different devices. Therefore, according to one embodiment, interoperability between devices is provided with respect to licenses. For example, a person can pay to have a plurality of devices associated with a interoperable domain. A interoperable rights token is used to indicate the use of content on the plurality of devices associated with the interoperable domain. However, to date DRMs are not capable of dealing with interoperable domains. Therefore, the DRMs would not be able to determine whether their respective native licenses are valid in the context of a interoperable domain. For example, assume for the sake of illustration that the person is using the maximum number of devices, device A, B, and C, allowed and they want to replace one of those devices B with a new device D. In order to replace device B with device D, the native license associated with device B's DRM would need to be invalidated. If the native license associated with device B is not invalidated, then the person would be able to play content on four devices (A, B, C, and D) when they had only paid for three devices.

In another example, at some point in time the person may decide that they want to upgrade to a new device that is, for example, the same type as their old device. Since the old and new devices are the same type, for example, both may be iPODs™, both of them use DRM systems for the same service provider. The license for the old device should, according to one embodiment, be invalidated. However, although the digital rights management systems on the new and the old devices are for the same service provider, they still do not communicate with each other.

Therefore with the conventional art a person may be able to continue to use their old device even after the license on the old device should have been invalidated, as will become more evident. The conventional art cannot be used to invalidate a native license associated with a particular DRM, for example, in order to replace devices. As will become more evident, various embodiments of the present invention provide for determining whether a native license is valid, for example, in the context of a domain.

The Environment

Figure 2:
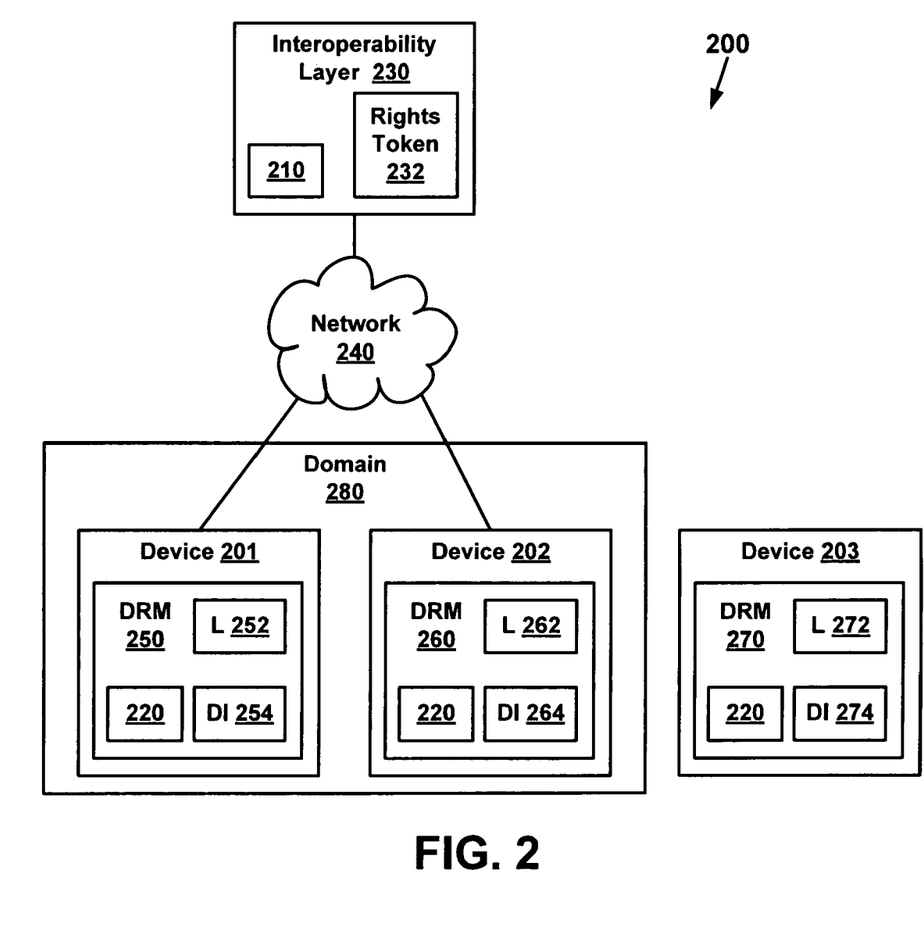
FIG. 2 is a block diagram depicting an interoperability environment in which systems for determining whether a native license is valid operate, according to one embodiment.

FIG. 2 is a block diagram depicting an interoperability environment in which systems for determining whether a native license is valid operate, according to one embodiment. The blocks that represent features in FIG. 2 can be arranged differently than as illustrated, and can implement additional or fewer features than what are described herein. Further, the features represented by the blocks in FIG. 2 can be combined in various ways. The system 200 can be implemented using software, hardware, firmware, or a combination thereof.

FIG. 2 depicts three devices 201, 202, 203, a network 240, and an interoperability layer 230. The network 240 can be the Internet or a local network. As depicted in FIG. 2, two devices 201 and 202 are currently a part of a domain 280. As will become more evident, device 203 can replace either device 201 or 202 and appropriate actions can be taken with regards to their respective native licenses 242, 262, 272, according to various embodiments of the present invention. The interoperability layer 230, according to one embodiment, can be used, among other things, to provide interoperability between the different devices 201, 202, or 203 associated with a domain 280.

Examples of devices 201, 202, 203 include, among other things, a mobile device, a computer system, a digital television (TV), and a stereo system. A computer system can be, among other things, a desk top or a lap top. A computer system may be used by a particular person and therefore may be a personal computer. A mobile device can be among other things a portable music player, a personal digital assistant (PDA), or a cell phone. iPODS™ and MP3 players are examples of portable music players. Devices such as devices 201, 202, 203 shall also be referred to herein as "content handling devices" since they can be used to handle content. One of the ways that content handling devices may handle content is to render the content, however, content handling devices are not limited to rendering content. Further, a content handling device may handle content in some manner, such as storing the content, processing the content in some manner, transmitting the content to other devices, but not render content.

The three devices 201-203 each include a DRM system 250, 260, 270. The DRM systems 250, 260, 270 each include a native license 252, 262, 272, a decision indicator (DI) 254, 264, 274, and a system 220 for determining whether a license is valid, for example, in the context of a domain. A decision indicator 254 264, 274 is according to one embodiment a data structure. In one example, the data structure is a bit. Although many of the illustrations described herein assume the data structure is a bit, the data structure may be a more complex data structure.

Assuming for the sake of illustration that a decision indicator 254, 264, 274 is a bit, the decision indicator 254, 264, 274 can be set to true while the respective native license 252, 262, 272 is valid and be set to false while the respective native license 252, 262, 272 is invalid. The system 220 can check the decision indicator 254, 264, 274 before the respective device 201-203 is allowed to render digital content. If the decision indicator 254, 264, 274 is true, then system 220 allows the device 201-203 to render the digital content. Otherwise, system 220 does not allow the respective device 201-203 to render the digital content. Content can be audio content, visual content, or audio visual content. The term "render" shall refer to, among other things, playing audio content, displaying visual content, and playing and displaying audio visual content.

The interoperability layer 230, according to one embodiment, enables interoperability between devices that are associated with a domain 280. For example, the interoperability layer 230, according to one embodiment, includes a system 210 that enables determining whether native licenses 252, 262, 272 are valid, for example, in the context of a domain 280, as will become more evident. The interoperability layer 230, according to one embodiment, is co-located with the system 210. However, according to another embodiment, system 210 can be located on a different device than the electronic device the interoperability layer 230 resides on.

The interoperability layer 230 includes an interoperable rights token 232 and a system 210 that enables a digital rights management system 250, 260, 270 to determine if the respective license 252, 262, 272 is valid. The rights token 232 associated with the interoperability layer 230, according to one embodiment, can represent one or more aspects of the native licenses 252, 262, 272 for the devices 201, 202, or 203 associated with a domain 280. For example, the rights token may be translated into native licenses 252, 262, 272.

According to one embodiment, a rights token is a data object that specifies a domain, a content item and a set of usage rules for the content item. According to one embodiment, the rights token is used as a part of determining whether content can be downloaded to a device. For example, content can be downloaded to any device that belongs to the domain that the rights token is associated with. For example, assume that device A and B belong to a domain. Conventionally device A could only download content from service provider A and device B could only download content from service provider B. However, according to various embodiments, content from either service provider A or B could be downloaded to either device A or device B.

System 210, according to one embodiment, receives information indicating that a device 201-203 is added to the domain 280 or that a device 201-203 is deleted from the domain 280. System 210, according to another embodiment, causes the decision indicator 254, 264, 274 to be set to true, when a device 201-203 is added to the domain 280 and to be set to false, when a device 201-203 is deleted from the domain 280. System 210, according to yet another embodiment, prevents more than the maximum number of devices to be added to the domain 280 than are allowed. For example according to one embodiment, a user can only add the number of devices that they have paid for. According to one embodiment, the system 210 determines whether the number of devices in a domain 280 is less than or equal to the maximum number of devices allowed for the domain 280.

Figure 3:
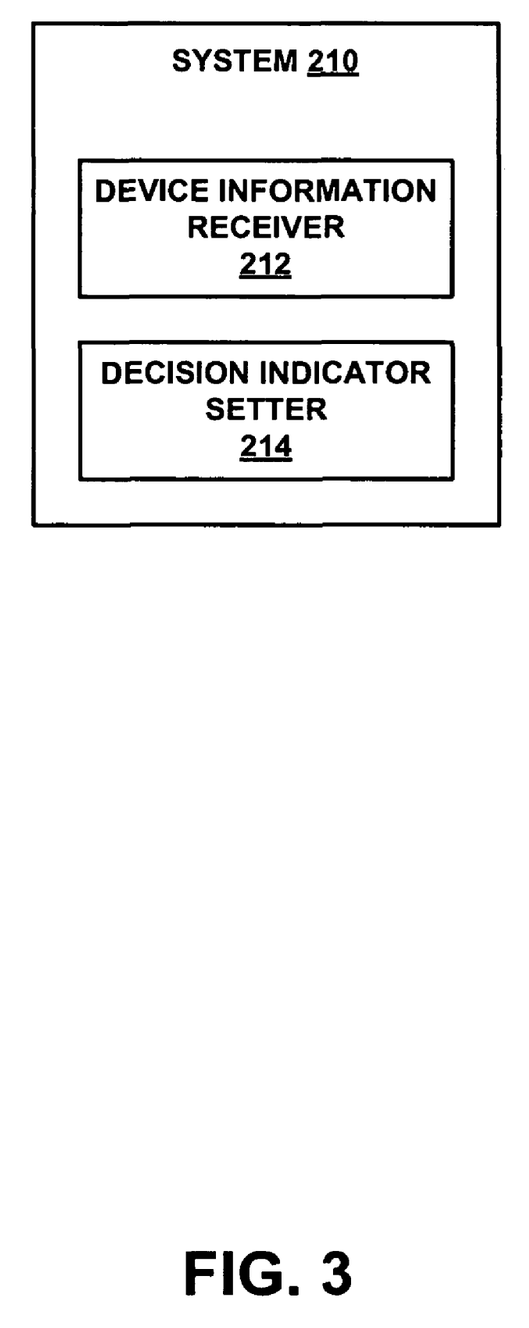
FIG. 3 depicts a system that enables a digital rights management system to determine whether its native license is valid, according to one embodiment.

Systems That Pertain to Determining Whether a Digital Rights Management System's Native License is Valid FIG. 3 depicts a system that enables a digital rights management system to determine whether its native license is valid, according to one embodiment. The blocks that represent features in FIG. 3 can be arranged differently than as illustrated, and can implement additional or fewer features than what are described herein. Further, the features represented by the blocks in FIG. 3 can be combined in various ways. The system 210 can be implemented using software, hardware, firmware, or a combination thereof.

The system 210 includes a device information receiver 212 and a decision indicator setter 214. The system 210 can be associated with an interoperability layer 230 as depicted in FIG. 2. The system 210 can reside locally on a device 201, 202, and 203 or remotely on a different device, such as a server or a computer system, which can communicate with a device 201, 202, 203, for example, over a network. The system 210, for example, can be installed at the manufacturers.

The device information receiver 212, according to one embodiment, receives information indicating that a device 201-203 is added to or deleted from the domain 280. The person who has paid to associate devices with the domain 280 may use, for example, a user interface to add a device to or delete a device from the domain 280. The device information receiver 212 can receive the information requesting that a device be added or deleted. According to one embodiment, a database is used to track which devices are currently associated with a domain 280. The database is updated when a device is added to or deleted from the domain 280, according to one embodiment.

The decision indicator setter 214 causes the decision indicator to be set in the appropriate device to indicate that it has a valid license or an invalid license. According to one embodiment, the decision indicator setter 214 will cause the decision indicator to be set to true for added devices as long as the maximum number of devices that a user has paid for has not been exceeded.

Figure 4:
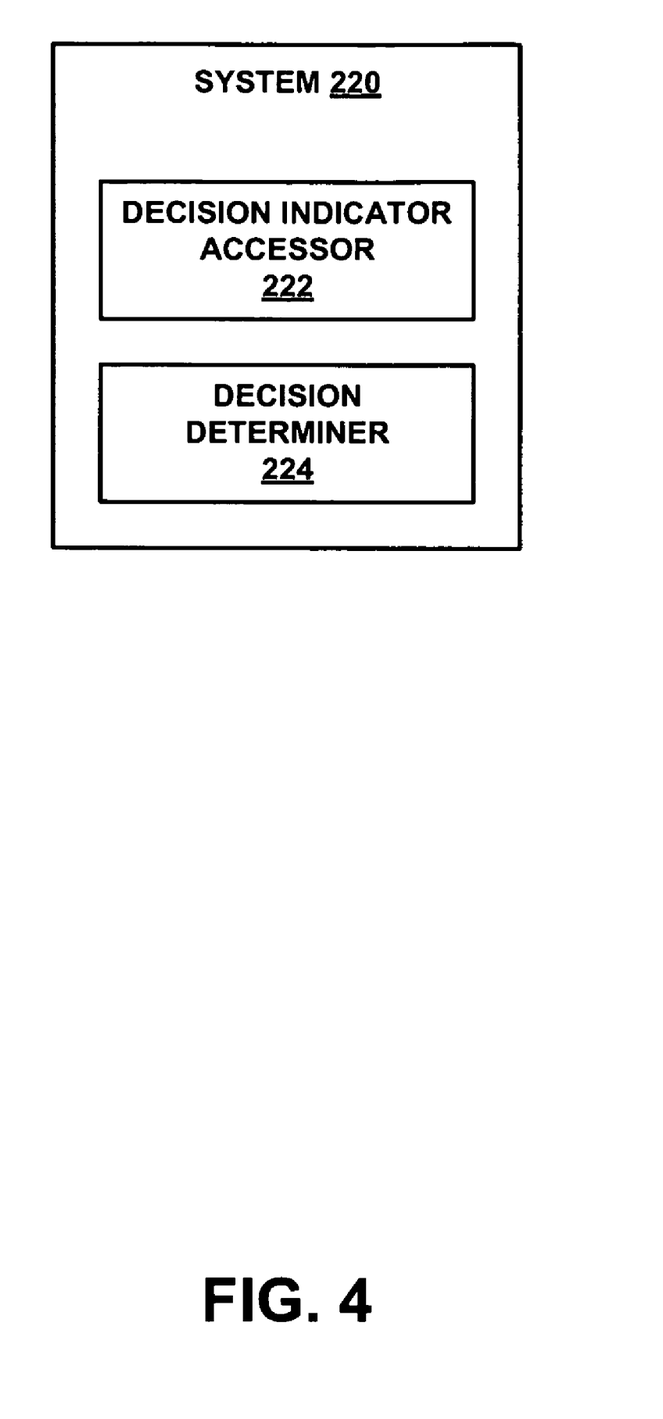
FIG. 4 depicts a system for determining whether a digital rights management system's native license is valid, according to one embodiment.

FIG. 4 depicts a system for determining whether a digital rights management system's native license is valid. The blocks that represent features in FIG. 4 can be arranged differently than as illustrated, and can implement additional or fewer features than what are described herein. Further, the features represented by the blocks in FIG. 4 can be combined in various ways. The system 220 can be implemented using software, hardware, firmware, or a combination thereof. According to one embodiment, system 220 is associated with an application layer.

The system 220 includes a decision indicator accessor 222 and a decision determiner 224. The system 220, according to one embodiment, can reside on a device 201, 202, and 203. The system 220, for example, can be installed on a device 201-203 at the manufacturers.

The decision indicator accessor 222 can access the decision indicator for a particular device to retrieve the value that the decision indicator is set to. The decision determiner 224 can use the value to determine whether the native license for that particular device is valid, for example, in the context of a domain. The device, according to one embodiment, is allowed to render digital content if the native license is valid.

Decision Indicator

As already stated, the decision indicator can be a data structure that indicates whether content can be rendered on a device. For example, conventional DRMs and conventional native licenses have no knowledge of interoperable domains. Therefore, a conventional DRM is not able to invalidate its own native license in the event that a device, for example, is deleted from the domain. Therefore, according to one embodiment, a system 210 associated with an interoperability layer 230 can use a decision indicator to communicate to a device that its native license is no longer valid in the context of a domain 280.

As already stated, according to one embodiment, the system 220 checks the decision indicator 254, 264, 274 before the respective device 201-203 is allowed to render digital content. For example, the system 220 can check the decision indicator 252, 262, 272 before allowing the respective DRM system 250, 260, 270 to evaluate its associated native license 252, 262, 272, which according to one embodiment determines whether content can be unlocked.

The decision indicator can be a bit that is set to true or false depending on whether the native license is valid. In another embodiment, the decision indicator may be a pointer, for example, into functionality associated the interoperability layer. According to yet another embodiment, the decision indicator is based on the presence of digital content. For example, an interoperability layer could cause the digital content on a device to be deleted when that device's native license becomes invalid.

According to one embodiment, the way that a decision indicator is implemented depends on the capabilities for the digital rights management system it will be implemented for. For example, if a digital rights management system is not capable of implementing a decision indicator as a data structure, it may implement the decision indicator by deleting digital content when the license is no longer valid. Therefore, according to one embodiment, the presence or absence of digital content can serve as a decision indicator.

Usage Rules

According to one embodiment usage rules can be used to specify how content may be rendered. The usage rules may be associated with a rights token. Examples of usage rules include that a native license is valid during certain periods of time, is valid up until an expiration date, or is valid only in a certain geographical location.

According to one embodiment, a different set of usage rules can be associated with different content. For example, usage rules associated with media file A may specify that the digital content can be rendered while a device, which media file A is on, is in Europe. Another set of usage rules associated with media file B may specify that media file B can be rendered in Europe until May 20, 2007. Yet another set of usage rules associated with media file C may specify that media file C can be rendered until Nov. 11, 2006.

According to one embodiment, usage rules can be used as a part of determining whether a native license is valid. Continuing the illustration, in the first example, the native license is valid while the device is in Europe. In the second example, the native license is valid while the device is in Europe and until May 20, 2007.

According to one embodiment, the device information receiver 212 can receive information indicating that a certain usage rule has come into effect. For example, if the device has moved outside of Europe, a GPS system associated with the device can detect that it has moved outside of Europe. Information indicating that the device is outside of Europe can be sent to the device information receiver 212. Similarly, the device information receiver 212 can receive information pertaining to periods of time or expiration dates. In response, the decision indicator setter 214 can cause the decision indicator to be set.

Figure 5:
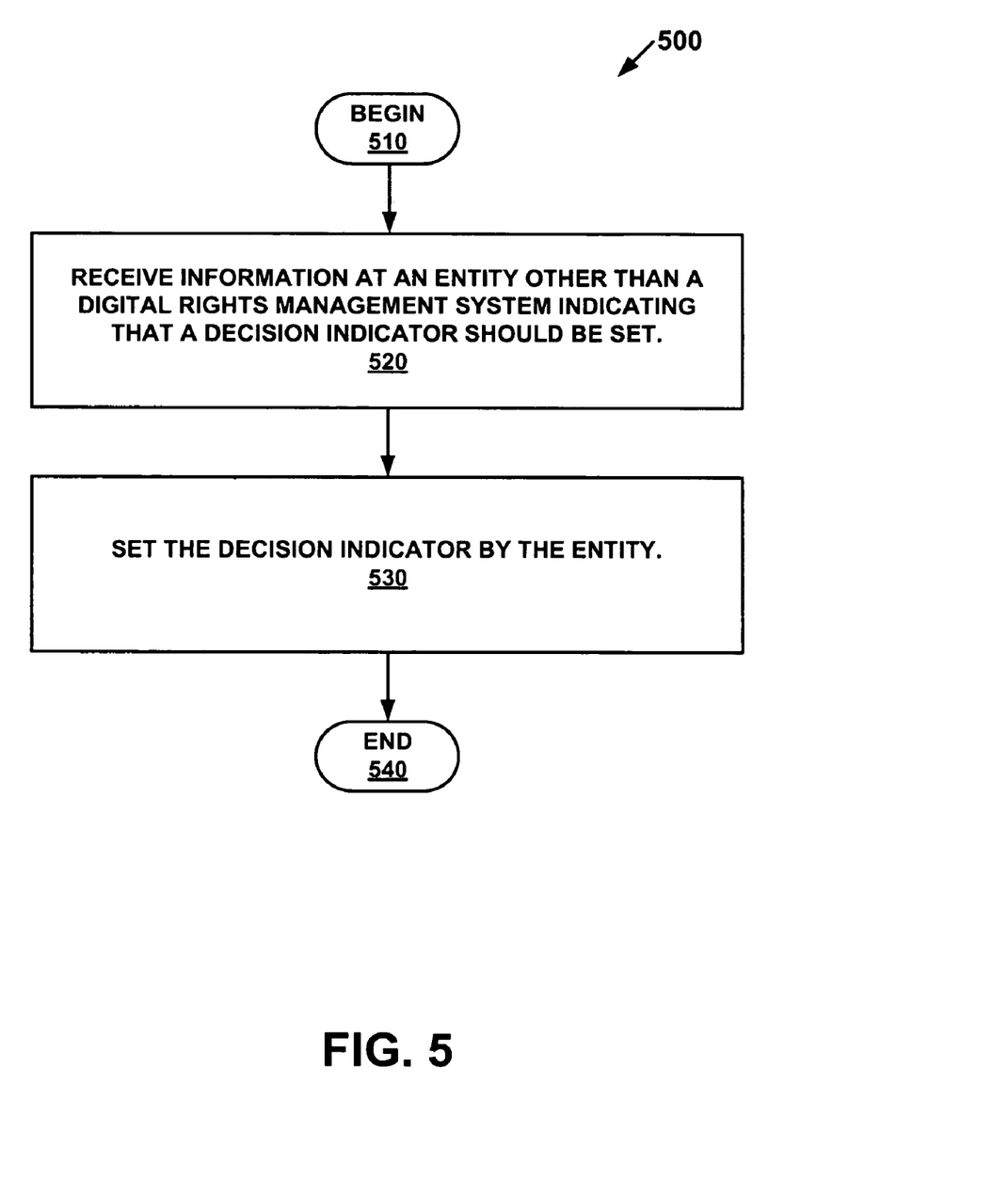
FIGS. 5 and 6 are flowcharts for methods that pertain to determining whether a digital rights management system's native license is valid, according to embodiments of the present invention.
Figure 6:
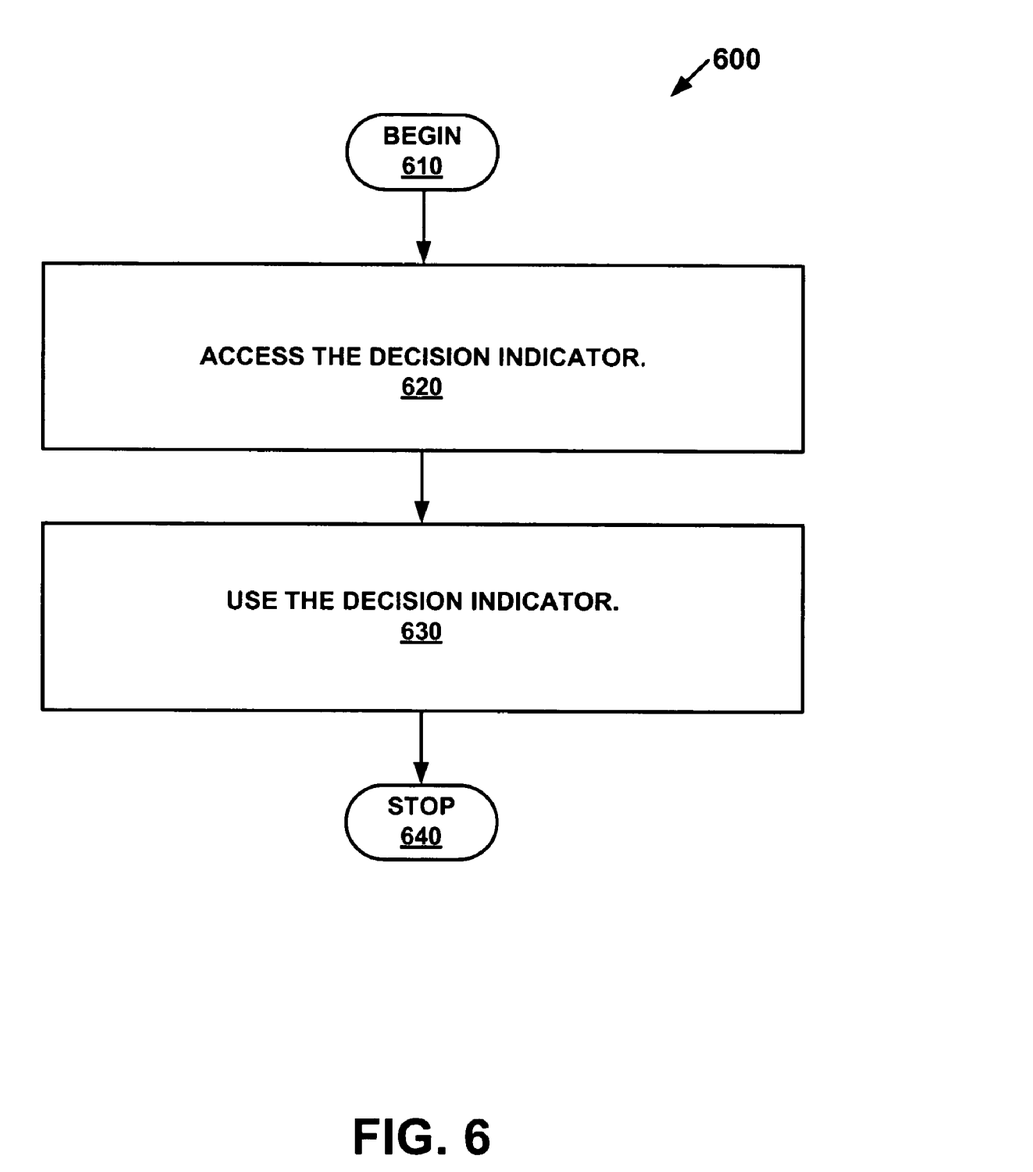

Methods That Pertain to Determining Whether a Digital Rights Management System's Native License is Valid FIGS. 5 and 6 are flowcharts for methods that pertain to determining whether a digital rights management system's native license is valid, according to embodiments of the present invention. Although specific steps are disclosed in flowcharts 500, 600, such steps are exemplary. That is, embodiments of the present invention are well suited to performing various other steps or variations of the steps recited in flowcharts 500, 600. It is appreciated that the steps in flowcharts 500, 600 may be performed in an order different than presented, and that not all of the steps in flowcharts 500, 600 may be performed.

All of, or a portion of, the embodiments described by flowcharts 500, 600 can be implemented using computer-readable and computer-executable instructions which reside, for example, in computer-usable media of a computer system or like device. As described above, certain processes and steps of the present invention are realized, in one embodiment, as a series of instructions (e.g., software program) that reside within computer readable memory of a computer system and are executed by the of the computer system. When executed, the instructions cause the computer system to implement the functionality of the present invention as described below.

Assume for the sake of illustration, that a person bought a personal computer (PC) that has an interoperability layer 230, which includes a system 210. Also assume for the sake of illustration that the person has bought devices 201, 202, 203 with a system 220 on them.

Referring to FIG. 5, at step 510 the method begins.

At step 520, information is received at an entity other than a digital rights management system indicating that a decision indicator should be set. For example, for the sake of illustration assume that a person has paid for the right to obtain digital content. Also assume that they have paid to have 2 devices 201, 202 in a domain 208. The maximum number of devices can be enforced by configuring the interoperability layer 230 in some manner. For example, the interoperability layer 230 may be configured at the store where the person bought their PC. In another example, the person may use their PC to connect to an Internet service. The Internet service may configure the interoperability layer 230 with the maximum number of devices over the Internet. The internet service may be controlled for example by a company that provides the interoperability layer 230. In yet another example, the user may be provided with digital medium, such as a CD, that they use to configure their interoperability layer 230 with.

According to one embodiment, when a domain is established, for example by some service, a rights token can be issued for that domain. For example, a rights token can be created specifying that domain. According to one embodiment, every device associated with that domain receives a native license that is derived from the rights token.

The device information receiver 212 of system 210 on the interoperability layer 230 can receive information indicating that devices 201 and 202 have been added. Various methods can be used to indicate that devices are being added or deleted. For example, the person may enter data into their PC indicating that the devices 201 and 202 are to be added to the domain 280. In another example, the person may use a user interface on the devices 201 and 202 to add the devices 201 and 202 to the domain 280.

According to one embodiment, the interoperability layer 230 is an example of "an entity other than a digital rights management system." According to one embodiment, the decision of whether a native license is valid is "outside the scope" of a digital rights management system for example because a particular digital rights management system does not have enough information or knowledge to determine whether its native license should be valid, for example, in the context of a domain. Continuing the example, devices 201 and 202 would not have enough information to set their own decision indicators 254, 264 because they do not know that the maximum number of devices for the domain 280 is limited to 2.

At step 530, the decision indicator is set by the entity. For example, the decision indicator setter 214 associated with the interoperability layer 230 can cause the decision indicators 254, 264 to be set to true in devices 201 and 202 indicating their respective native licenses 252, 262 are valid. The decision indicator setter 214 may cause a decision indicator to be set by setting the decision indicator itself or by causing, for example, logic associated with the respective device 201, 202 to set the decision indicator. The setting of a decision indicator 254, 264 enables the respective digital rights management systems 250, 260 to determine whether their native license 252, 254 is valid or not, as will become more evident.

At step 540, the method ends.

Referring to FIG. 6, at step 610, the method begins.

At step 620, the decision indicator is accessed. For example, assume for the sake of illustration that the person wants to render digital content on device 201. The decision indicator accessor 222 on the device 201 they are using can obtain the value that the decision indicator 254 is set to.

At step 630, the decision indicator is used. For example, the decision determiner 224 on device 201 can use the value of the decision indicator accessed in step 620 to determine whether the native license 252 is valid. If the value is true the native license 252 is valid and the device 201 will be allowed to render the digital content. However, if the value is false the native license 252 is not valid and the device 201 will not be allowed to render the digital content. In this illustration, the native license 252 is valid and therefore the device 201 will be allowed to render digital content.

At step 640, the method stops.

Now for the sake of illustration, assume that the person wants to replace device 202 with device 203. According to one embodiment, replacing a first device with a second device can be accomplished by deleting the first device from a domain 280 and adding the second device to the domain 280. At step 520, the device information receiver 212 can receive information indicating that device 202 is to be deleted from the domain 280. At step 530, the decision indicator setter 214 can cause the decision indicator 254 associated with device 202 to be set to false. Further, at step 520 the device information receiver 212 can receive information indicating that device 203 is being added to the domain 280. At step 530, the decision indicator setter 214 can cause the decision indicator 274 associated with device 203 to be set to true. In a specific example, device 203 would not have enough information to set its own decision indicator 274 to true because, among other things, device 203 does not know that device 202 has been deleted and because device 203 does not know that the maximum number of devices is limited to 2 in this illustration. Steps 620 and 630 can be used to allow device 203 to render digital content and to prevent device 202 from rendering digital content.

The rights token 232 can be used with more than one type of digital rights management system, according to one embodiment. For example, a person may pay service provider A to have 2 devices and pay service provider B to have 3 devices. The rights token 232 could be used to track both using various embodiments described herein.

CONCLUSION

Since conventional DRM systems do not communicate with each other, users are forced into "walled gardens" where content cannot be rendered on different devices associated with different service providers. According to one embodiment, aspects of interoperability between devices is provided. The rights token may have associated constraints, such as interoperable domain membership, that the DRM systems and native licenses have no knowledge of. According to various embodiments, communication between the interoperability layer and the DRM systems is provided. For example, domain membership can be validated even when the DRM systems do not support the concept of a interoperable domain.

Various embodiments of the present invention enable native licenses to be validated and invalidated properly without requiring digital rights management systems to make large changes. As can be seen, DRM systems are provided with the ability to read a decision indicator that has been set, for example, by a trusted entity, such as an interoperability layer.

Further, various embodiments of the present invention enable companies to protect their assets in the context of a DRM interoperability framework and at the same time allow users to have a richer and more varied experience.

What is claimed is:

1. A method of enabling a digital rights management system to determine whether a native license is valid, the method comprising:
   accessing, by a computer, a value of a decision indicator at a digital rights management system, wherein the decision indicator is set by a trusted entity other than the digital rights management system, wherein the decision indicator is a data structure associated with a device for indicating whether the native license is valid on the device; and
   using the value of the decision indicator at the decision rights management system to determine whether the native license associated with the digital rights management system is valid for rendering digital content on the device.

2. The method as recited in claim 1, wherein the accessing of the value of the decision indicator at the digital rights management system further comprises:
   accessing the decision indicator at the digital rights management system associated with a content handling device that will render content based on a native license.

3. The method as recited in claim 1, wherein the method further comprises:
   using cryptographic means to determine that the value of the decision indicator was set by the trusted entity.

4. The method as recited in claim 1, wherein the accessing of the decision indicator at the digital rights management system further comprises:
   accessing the decision indicator at a content handling device that is selected from a group consisting of a mobile device, a computer system, a digital television, and a stereo system.

5. The method as recited in claim 1, wherein the setting of the decision indicator by the trusted entity further comprises:
   setting the decision indicator based at least in part on determining whether a content handling device associated with the digital rights management system is a member of a domain of devices.

6. The method as recited in claim 5, wherein the setting of the decision indicator further comprises:
   setting the decision indicator based at least in part on a factor selected from a group consisting of location of the content handling device, a period of time, and an expiration date.

7. The method as recited in claim 5, wherein the setting of the decision indicator further comprises:
   setting the decision indicator based at least in part on a maximum number of devices that can be associated with the domain.

8. A system for a digital rights management system to make a decision that is outside the scope of the digital rights management system, the system comprising:
   a decision indicator accessor as part of a digital rights management system for accessing a value of a decision indicator, wherein the decision indicator was set by a trusted entity other than the digital rights management system, wherein the decision indicator is a data structure associated with a device for indicating whether a native license is valid on the device; and
   a decision determiner as part of a digital rights management system that uses the value of the decision indicator within the digital rights management system to determine whether the native license associated with the digital rights management system is valid for rendering digital content on the device.

9. The system of claim 8, wherein the decision indicator was set by a decision indicator setter that is part of an interoperability layer that provides interoperability between one or more digital rights management systems.

10. The system of claim 9, wherein the decision indicator setter is the trusted entity.

11. The system of claim 8, wherein the decision indicator indicates whether a native license associated with the digital rights management system is valid in the context of a domain of devices.

12. The system of claim 8, wherein the location of the system is selected from a group consisting of a content handling device that the digital rights management system is associated with and a computer system that communicates with the content handling device.

13. The system of claim 8, wherein the digital rights management system does not have sufficient information to determine how to set the decision indicator.

14. The system of claim 8, wherein the decision indicator accessor and the decision determiner reside on a content handling device that the digital rights management system is associated with.

15. The system of claim 8, wherein the decision indicator is set based at least in part on determining whether a content handling device associated with the digital rights management system is a member of a domain.

16. A non-transitory computer-usable storage medium having computer-readable program code embodied therein that when executed by a computer system performs a method of enabling a digital rights management system to determine whether its native license is valid, the method comprising:
   accessing, by a computer, at a digital rights management system, a value of a decision indicator, wherein the decision indicator is set by a trusted entity other than the digital rights management system, wherein the decision indicator is a data structure associated with a device for indicating whether the native license is valid on the device; and
   using the value of the decision indicator at the decision rights management system to determine whether the native license associated with the digital rights management system is valid for rendering digital content on the device.

17. The non-transitory computer-usable storage medium of claim 16, wherein the computer-readable program code embodied therein causes a computer system to perform the method, and wherein the method further comprises:
   accessing the decision indicator at the digital rights management system associated with a content handling device that will handle the content associated based on a native license.

18. The non-transitory computer-usable storage medium of claim 16, wherein the computer-readable program code embodied therein causes a computer system to perform the method, and wherein the setting of the decision indicator by the entity further comprises:
   setting the decision indicator based at least in part on determining whether a content handling device associated with the digital rights management system is a member of the domain of devices.

19. The non-transitory computer-usable storage medium of claim 16, wherein the computer-readable program code embodied therein causes a computer system to perform the method, and wherein the accessing of the value of the decision indicator at the digital rights management system further comprises:
   accessing a value that was set by a decision indicator setter that is part of an interoperability layer that provides interoperability between one or more digital rights management systems.

20. The non-transitory computer-usable storage medium of claim 16, wherein the computer-readable program code embodied therein causes a computer system to perform the method, and wherein the method further comprises:
   using cryptographic means to determine that the value of the decision indicator was set by the trusted entity.

* * * * *